(12) United States Patent
Biskeborn et al.

(10) Patent No.: US 8,797,683 B2
(45) Date of Patent: Aug. 5, 2014

(54) MAGNETIC HEAD AND STORAGE SYSTEM HAVING TWO INNER AND TWO OUTER ARRAYS OF WRITERS

(71) Applicant: International Business Machines Corporation, Armonk, NY (US)

(72) Inventors: Robert G. Biskeborn, Hollister, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/028,995

(22) Filed: Sep. 17, 2013

(65) Prior Publication Data

US 2014/0016231 A1    Jan. 16, 2014

Related U.S. Application Data

(60) Division of application No. 13/531,425, filed on Jun. 22, 2012, now Pat. No. 8,587,898, which is a continuation of application No. 12/111,666, filed on Apr. 29, 2008, now Pat. No. 8,243,385.

(51) Int. Cl.
*G11B 5/265* (2006.01)
*G11B 5/29* (2006.01)

(52) U.S. Cl.
USPC .......................................................... 360/121

(58) Field of Classification Search
CPC ........ G11B 5/265; G11B 5/29; G11B 5/2652; G11B 5/2654; G11B 5/00826; G11B 5/0083
USPC .......................................................... 360/121
See application file for complete search history.

(56) References Cited

U.S. PATENT DOCUMENTS

| | | | |
|---|---|---|---|
| 4,423,450 A | 12/1983 | Hamilton |
| 4,439,793 A | 3/1984 | Nater |
| 4,685,005 A | 8/1987 | Fields, Jr. |
| 5,452,165 A | 9/1995 | Chen et al. |
| 5,862,014 A | 1/1999 | Nute |
| 6,400,521 B1 | 6/2002 | Kaaden |
| 8,243,385 B2 | 8/2012 | Biskeborn et al. |
| 8,587,898 B2 | 11/2013 | Biskeborn et al. |

(Continued)

FOREIGN PATENT DOCUMENTS

DE    3318902    11/1984

OTHER PUBLICATIONS

Restriction/Election Requirement from U.S. Appl. No. 12/111,666 dated Sep. 28, 2011.

(Continued)

*Primary Examiner* — Craig A. Renner
(74) *Attorney, Agent, or Firm* — Zilka-Kotab, PC

(57) ABSTRACT

A magnetic head in one embodiment includes a first outer array of writers; a second outer array of writers; a first inner array of writers positioned between the first and second outer arrays; a second inner array of writers positioned between the first inner array and the second outer array; and an array of readers, at least some of the readers being generally aligned with the writers of the first and second outer arrays in a direction of media travel relative thereto, wherein the writers of the first inner array are misaligned with the writers of the first outer array relative to the direction of media travel.

19 Claims, 10 Drawing Sheets

(56) References Cited

U.S. PATENT DOCUMENTS

| | | | |
|---|---|---|---|
| 2004/0021982 A1* | 2/2004 | Ozue et al. | 360/121 |
| 2005/0007700 A1 | 1/2005 | Nagai | |
| 2005/0047008 A1 | 3/2005 | Tateishi | |
| 2005/0122623 A1* | 6/2005 | Dee | 360/129 |
| 2005/0134989 A1 | 6/2005 | Girvin et al. | |
| 2005/0152066 A1* | 7/2005 | Yip | 360/241.1 |
| 2005/0152067 A1* | 7/2005 | Yip et al. | 360/241.1 |
| 2007/0047142 A1 | 3/2007 | Biskeborn | |
| 2008/0112077 A1 | 5/2008 | Maejima et al. | |
| 2008/0137235 A1 | 6/2008 | Biskeborn et al. | |
| 2009/0231756 A1 | 9/2009 | Koeppe | |
| 2012/0074978 A1 | 3/2012 | Gentrup | |

OTHER PUBLICATIONS

Non-Final Office Action from U.S. Appl. No. 12/111,666 dated Oct. 25, 2011.

Final Office Action from U.S. Appl. No. 12/111,666 dated Jan. 25, 2012.

Notice of Allowance and Fee(s) Due from U.S. Appl. No. 12/111,666 dated Apr. 5, 2012.

Restriction/Election Requirement from U.S. Appl. No. 13/531,425 dated Sep. 14, 2012.

Non-Final Office Action from U.S. Appl. No. 13/531,425 dated Dec. 6, 2012.

Final Office Action from U.S. Appl. No. 13/531,425 dated Apr. 25, 2013.

Notice of Allowance and Fee(s) Due from U.S. Appl. No. 13/531,425 dated Jul. 12, 2013.

\* cited by examiner

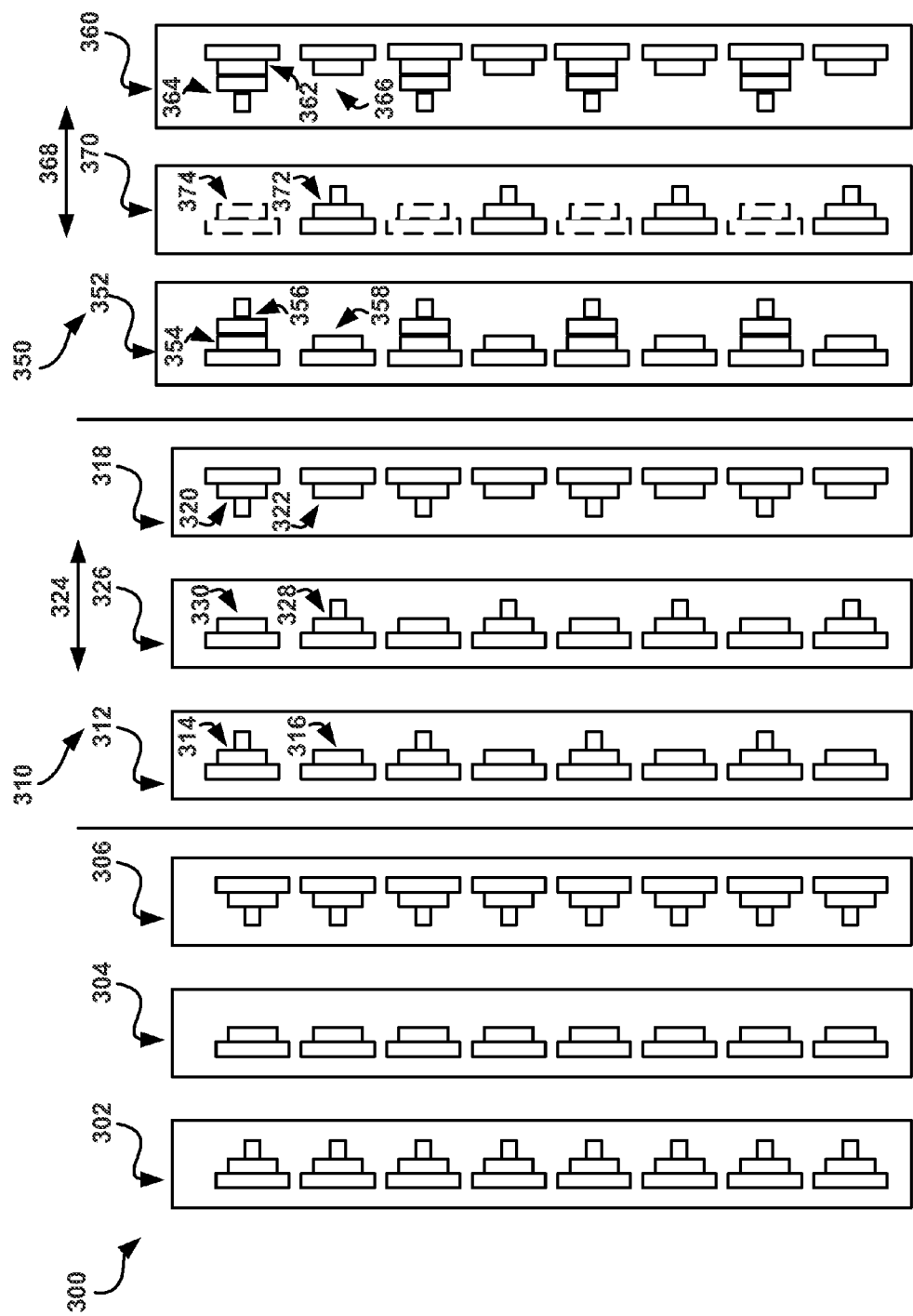

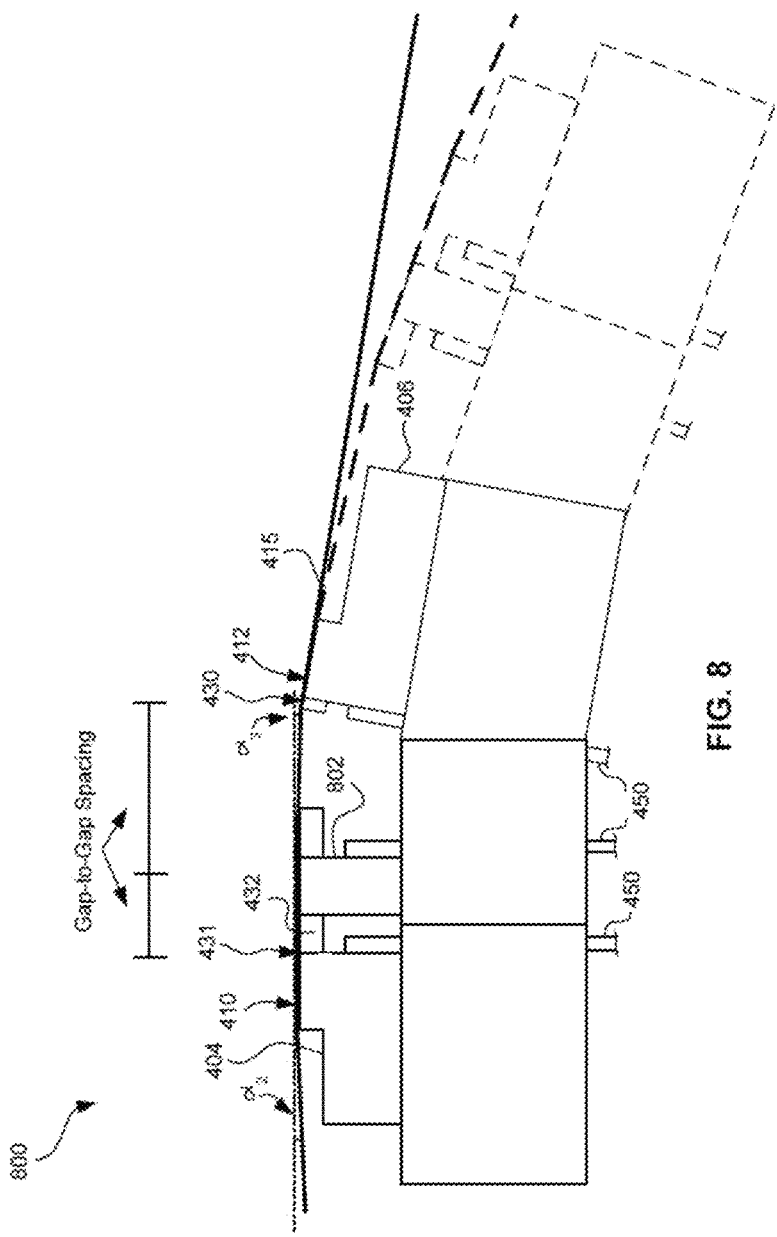

MAGNETIC HEAD AND STORAGE SYSTEM HAVING TWO INNER AND TWO OUTER ARRAYS OF WRITERS

RELATED APPLICATIONS

This application is a divisional of U.S. patent application Ser. No. 13/531,425 filed Jun. 22, 2012, which is a continuation of U.S. patent application Ser. No. 12/111,666 filed Apr. 29, 2008, from all of which priority is claimed and which are all herein incorporated by reference.

BACKGROUND

The present invention relates to data storage systems, and more particularly, this invention relates to a magnetic head having spatially separated arrays of writers.

In magnetic storage systems, data is commonly read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

When data is written to a tape, the span of data written is the span of the head elements. However, any expansion and contraction of the tape prior to reading results is similarly an expansion or contraction of the space between data tracks and, in turn, the span of written data. For instance, the width of the tape is known to change with changes in temperature (e.g. thermal expansion) and humidity (e.g. hygroscopic expansion). In addition, aging of the tape media tends to also change dimensions of the tape over time, adding to these effects for the cases of older tapes used for archiving data. Present tapes typically expand and contract by approximately 1 part in 1000, or 0.1%.

For future generations of tape heads, minimizing the spacing between concurrently written tracks is desirable for the purpose reducing the hydroscopic and thermal effects of the tape. However, as writers get spaced closer together, signal crossover between writers may occur. This crossover significantly degrades the writing performance. As a result, how closely the writers may be spaced is dependent upon providing sufficient spacing therebetween to minimize such crossover.

BRIEF SUMMARY

A magnetic head in yet another embodiment includes a first outer array of writers; a second outer array of writers; a first inner array of writers positioned between the first and second outer arrays; a second inner array of writers positioned between the first inner array and the second outer array; and an array of readers, at least some of the readers being generally aligned with the writers of the first and second outer arrays in a direction of media travel relative thereto, wherein the writers of the first inner array are misaligned with the writers of the first outer array relative to the direction of media travel.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

FIG. 3A is a partial tape bearing surface view of a magnetic head presented as a comparative example.

FIG. 3B is a partial tape bearing surface view of a magnetic head according to an embodiment of the present invention.

FIG. 3C is a partial tape bearing surface view of a magnetic head according to another embodiment of the present invention.

FIG. 8 illustrates a magnetic head according to one embodiment of the present invention where a substrate of a module is coupled to a closure.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of tape-based storage systems, as well as operation and/or component parts thereof.

In one general embodiment, a tape-based data storage system includes a first array of writers interleaved with readers. Additionally, a second array of writers interleaved with readers is included, the writers of the first array being generally aligned with the writers of the second array in a direction of media travel relative thereto, the readers of the first array being generally aligned with the readers of the second array in a direction of media travel relative thereto. Furthermore, a third array of writers interleaved with readers is included, the third array being positioned between the first and second arrays, the writers of the third array being generally aligned with the readers of the first and second arrays in a direction of media travel relative thereto, the readers of the third array being generally aligned with the writers of the first and second arrays in a direction of media travel relative thereto.

In another general embodiment, a tape-based data storage system includes a first array of piggybacked readers and writers interleaved with readers. Additionally, a second array of piggybacked readers and writers interleaved with readers is included, the writers of the first array being generally aligned with the writers of the second array in a direction of media travel relative thereto, the readers of the first array being generally aligned with the readers of the second array in a direction of media travel relative thereto. Furthermore, a third array of writers is included, the third array being positioned between the first and second arrays, the writers of the third array being generally aligned with some of the readers of the first and second arrays in a direction of media travel relative thereto.

Figure 1:
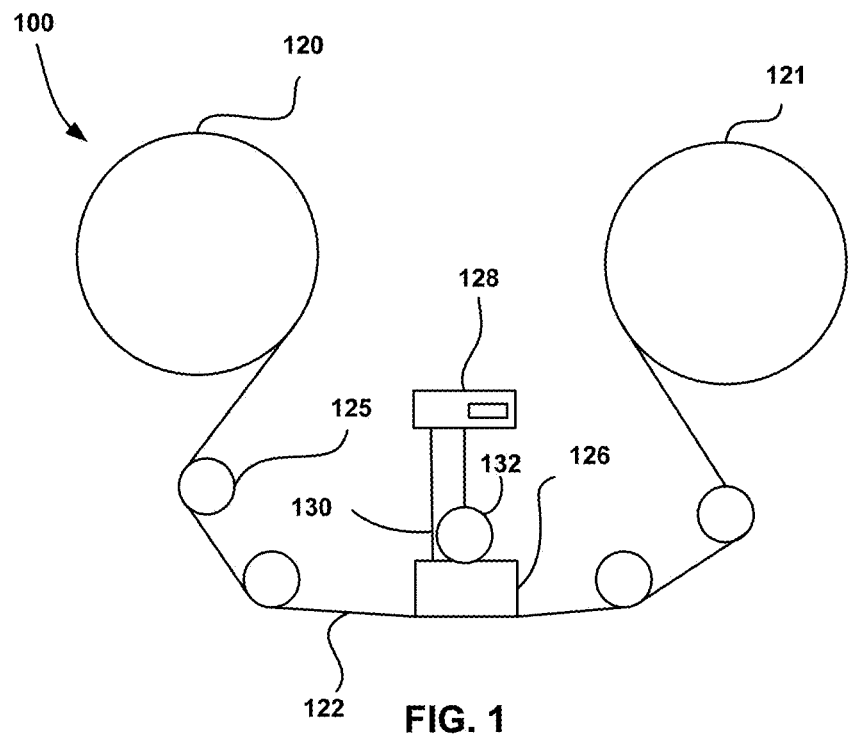
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

By way of example, FIG. 2 illustrates a flat-lapped bi-directional, two-module magnetic tape head 200 which may be implemented in the context of the present invention. As shown, the head includes a pair of bases 202, each equipped with a module 204, and may be fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4.5 degrees.

The substrates 204A are typically constructed of a wear resistant material, such as a ceramic. The closures 204B made of the same or similar ceramic as the substrates 204A. The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
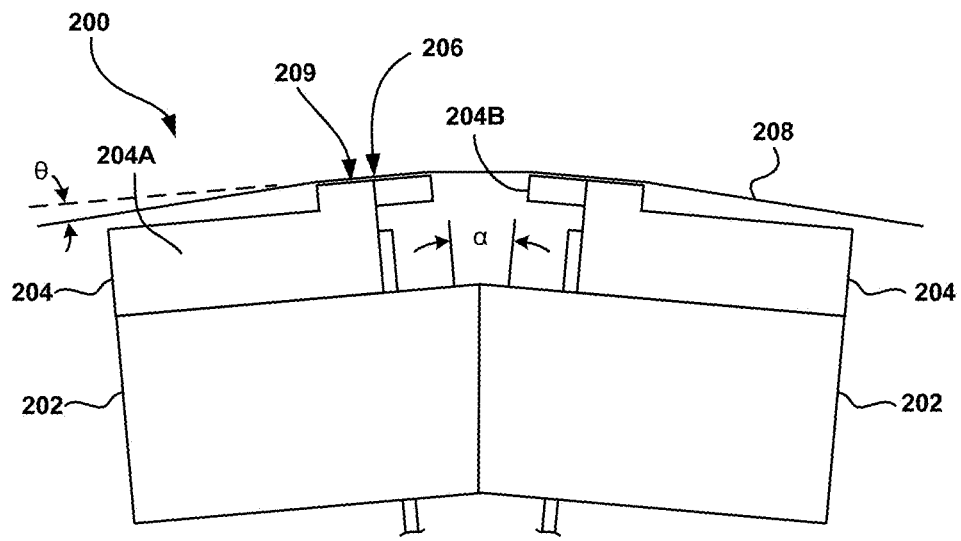
FIG. 2A illustrates a flat-lapped bi-directional, two-module magnetic tape head which may be implemented in the context of the present invention.
Figure 2B:
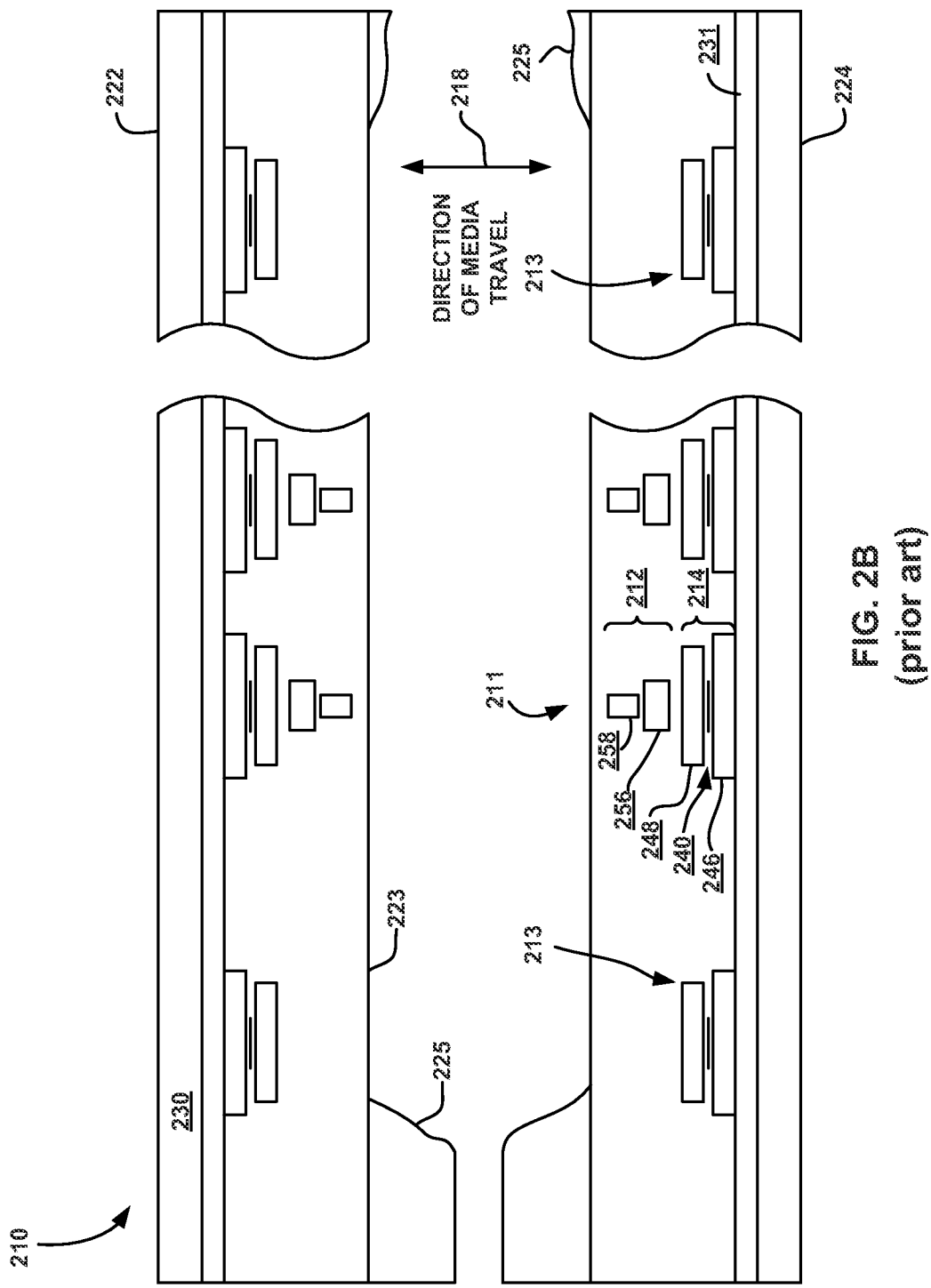
FIG. 2B a partial tape bearing surface view of a magnetic tape head.

FIG. 2B shows a partial tape bearing surface (TBS) view of a typical magnetic tape head assembly 210 having a plurality of read/write (R/W) pairs in a piggyback configuration formed on a common substrate 230 and an optional electrically insulative layer 231. The writers, exemplified by the write head 212 and the readers, exemplified by the read head 214, are aligned parallel to a direction of travel of a tape medium thereacross to form a R/W pair, exemplified by the R/W pair 211.

Several R/W pairs 211 may be present, such as 8, 16, 32 pairs, etc. The R/W pairs 211 as shown are linearly aligned in a direction generally perpendicular to a direction of tape travel thereacross. However, the pairs may also be aligned diagonally, etc. Servo readers 213 are positioned on the outside of the array of R/W pairs, the function of which is well known.

Generally, the magnetic tape medium moves in either a forward or reverse direction as indicated by arrow 218. The magnetic tape medium and head assembly 210 operate in a transducing relationship in the manner well-known in the art. The piggybacked head assembly 210 includes two thin-film modules 222 and 224 of generally identical construction.

Modules 222 and 224 are joined together with a space present between closures 225 thereof (partially shown) to form a single physical unit to provide read-while-write capability by activating the writer of the leading module and reader of the trailing module aligned with the writer of the leading module parallel to the direction of tape travel relative thereto. When a module 222, 224 of a piggyback head 210 is constructed, layers are formed in the gap 223 created above an electrically conductive substrate 230 (partially shown), e.g., of AlTiC, in generally the following order for the R/W pairs 211: an insulating layer 231, a first shield 246 typically of an iron alloy such as NiFe (permalloy), CZT or Al—Fe—Si (Sendust), a sensor 240 for sensing a data track on a magnetic medium, a second shield 248 typically of a nickel-iron alloy (e.g., 80/20 Permalloy), first and second writer pole tips 256, 258, and a coil (not shown).

The first and second writer poles 256, 258 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

It should be noted that the R/W pairs in the present embodiment may be positioned in close proximity in order to minimize the spacing between the concurrently written tracks for the purpose reducing the hydroscopic and thermal effects of a magnetic tape. In this case, as writers get closer together signal crossover may begin to emerge.

FIG. 3A is a partial tape bearing surface view of a magnetic head 300, presented as a comparative example, as will soon become apparent. As shown, a magnetic tape head 300 is provided which includes a first array of writers 302, a second array of writers 306, and a first array of readers 304 positioned between the first array of writers 302 and the second array of writers 306. In use, writers in the first array of writers 302 and the second array of writers 306 are positioned close together. As the writers get closer and closer in spacing, however, signal crossover between writers may potentially occur.

FIG. 3B is a partial tape bearing surface view of a magnetic tape head 310 according to one embodiment of the present invention. As shown, a magnetic head 310 is provided which includes a first array 312 of writers 314 interleaved with readers 316. Additionally, a second array 318 of writers 320 interleaved with readers 322 is included.

As shown further, the writers 314 of the first array 312 are generally aligned with the writers 320 of the second array 318 in a direction of media travel 324 relative thereto. Further, the readers 316 of the first array 312 are generally aligned with the readers 322 of the second array 318 in a direction of media travel 324 relative thereto.

With continued reference to FIG. 3B, a third array 326 of writers 328 interleaved with readers 330 is provided. As shown, the third array 326 is positioned between the first and second arrays 312 and 318. The writers 328 of the third array 326 are generally aligned with the readers 316 and 322 of the first and second arrays 312 and 318 in a direction of media travel 324 relative thereto. Furthermore, the readers 330 of the third array 326 are generally aligned with the writers 314 and 320 of the first and second arrays 312 and 318 in a direction of media travel 324 relative thereto.

It should be noted that, the first, second, and third arrays 312, 318, 326 may each be separately positioned on an individual module as shown in FIG. 3B. In another embodiment, however, at least two of the arrays may be adjoined on a common platform and are preferably separated spatially from each other in the direction of media travel 324 relative thereto. For example, the first, second, and third arrays 312, 318, 326 may each be positioned on a single module, e.g., as in a "single bump" head. Additionally, one of the arrays may be placed on one individual module and the other two may be placed together on a second module, e.g., in a "two bump" configuration as shown in FIG. 2A or FIG. 8. Further, various arrays may be formed in the same gap between the closure and substrate.

With continued reference to FIG. 3B, as an option, the first and second arrays 312 and 318 may lie along a common first media-bearing surface, wherein the third array 326 lies along a second media-bearing surface spaced from the common media-bearing surface. See, e.g., FIG. 8.

With continued reference to FIG. 3B, as another option, the writers 314, 320, 328 in each of the various arrays 312, 318, 326 may be aligned along a straight line. Such straight line may be oriented perpendicular to the direction of media travel, or at an angle thereto. In a variation, the writers may be staggered, e.g., formed on different planes of the module in a "zig-zag" configuration.

FIG. 3C is a partial tape bearing surface view of a magnetic head 350 according to another embodiment of the present invention. As shown, a magnetic head 350 is provided which includes a first array 352 of piggybacked readers 354 and writers 356 interleaved with readers 358. Additionally, a second array 360 of piggybacked readers 362 and writers 364 interleaved with readers 366 is included.

As also shown, the writers 356 of the first array 352 are generally aligned with the writers 364 of the second array 360 in a direction of media travel 368 relative thereto. Additionally, the readers 354, 358 of the first array 352 are generally aligned with the readers 362, 366 of the second array 360 in a direction of media travel 368 relative thereto.

A third array 370 of writers 372 is also present. As shown, the third array 370 is positioned between the first and second arrays 352 and 360. Additionally, the writers 372 of the third array 370 are generally aligned with some of the readers 358 and 366 of the first and second arrays 352 and 360 in a direction of media travel 368 relative thereto.

As an option, the third array 370 may further include readers 374 interleaved with the writers 372. In this case, the readers 374 of the third array 370 may be generally aligned with the writers 356 and 364 of the first and second arrays 352 and 360 in a direction of media travel 368 relative thereto.

It should be noted that, the first, second, and third arrays 352, 360, 370 may each be separately positioned on an individual module as shown in FIG. 3C. In another embodiment, however, at least two of the arrays may be adjoined on a common substrate and are preferably separated spatially from each other in the direction of media travel 368 relative thereto. For example, the first, second, and third arrays 352, 360, and 370 may each be positioned on the same module. Additionally, one of the arrays may be placed on an individual module and the other two may be placed on the same module. Further, various arrays may be formed in the same gap between the closure and substrate.

As an option, the first and second arrays 352 and 360 may lie along a common first media-bearing surface, wherein the third array 370 lies along a second media-bearing surface spaced from the common media-bearing surface.

As another option, the writers 356, 364, 372 in each of the various arrays 352, 360, 370 may be aligned along a straight line. Such straight line may be oriented perpendicular to the direction of media travel, or at an angle thereto. In a variation, the writers may be staggered, e.g., formed on different planes of the module in a "zig-zag" configuration.

Figure 3D:
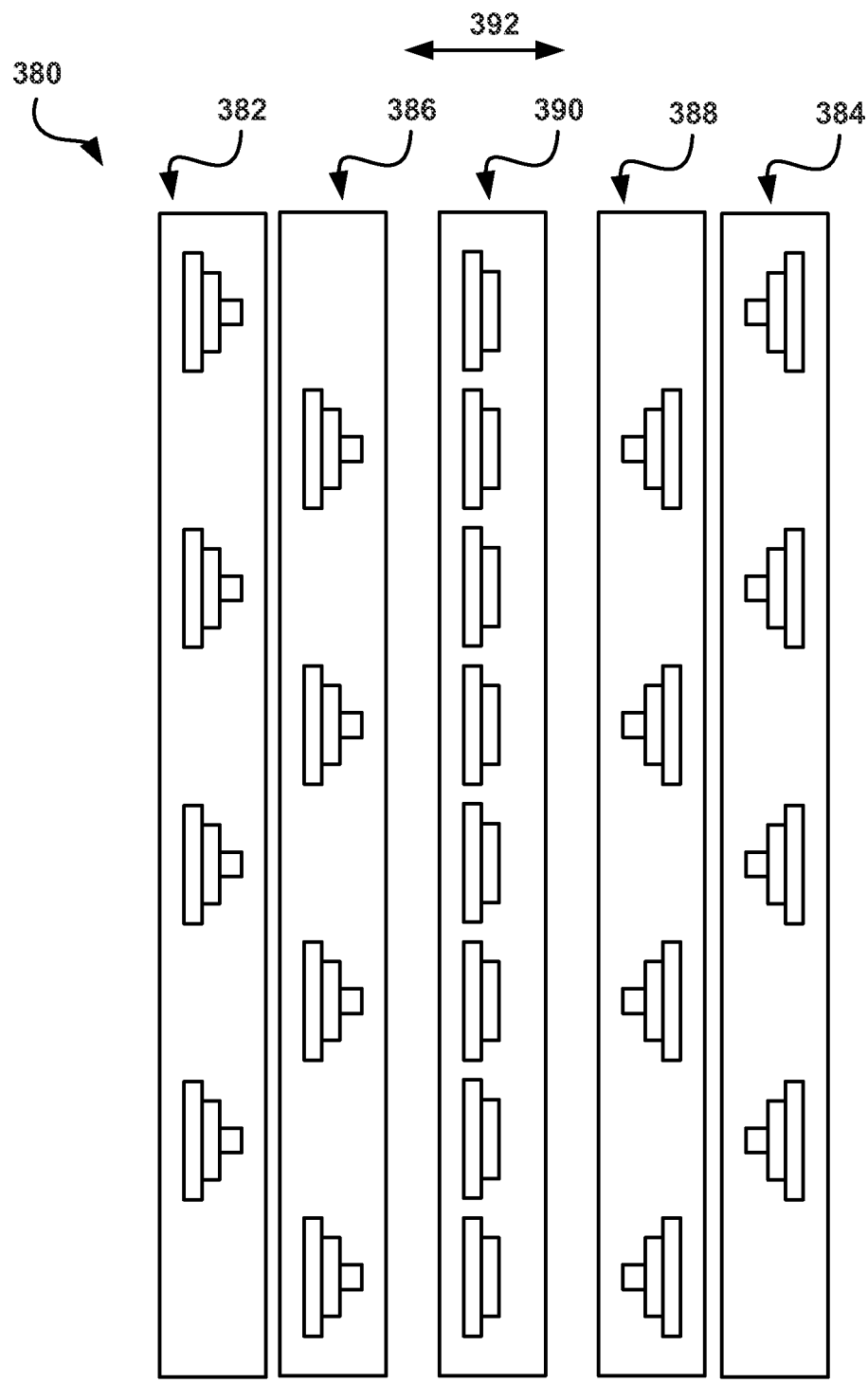
FIG. 3D is a partial tape bearing surface view of a magnetic head according to yet another embodiment of the present invention.

FIG. 3D is a partial tape bearing surface view of a magnetic head 380 according to yet another embodiment of the present invention. As shown, a magnetic head 380 is provided which includes a first outer array of writers 382, and a second outer array of writers 384. Additionally, a first inner array of writers 386 is included which is positioned between the first and second outer arrays 382 and 384.

Furthermore, a second inner array of writers 388 is provided which is positioned between the first inner array 386 and the second outer array 384. An array of readers 390 may also be provided. As shown, at least some of the readers 390 are generally aligned with the writers of the first and second outer arrays 382 and 384 in a direction of media travel 392 relative thereto. Additionally, the writers of the first inner array 386 are misaligned with the writers of the first outer array 382 relative to the direction of media travel 392.

As an option, the array of readers 390 may be positioned between the first and second inner arrays 386 and 388. Furthermore, at least some of the readers 390 may be generally aligned with the writers of the first and second inner arrays 386 and 388 in a direction of media travel 392 relative thereto. Additionally, in one embodiment, the misalignment of the writers of the first inner array 386 relative to the writers of the first outer array 382 is by about one half a distance between adjacent writers in the first outer array 382. In other words, the writers in the first inner array 386 may be positioned along lines that are about midpoint between the writers of the first outer array 382. In a preferred approach, as shown, the arrays of 382-388 are each aligned along a straight line extending through the particular array. In the embodiment shown, such imaginary line extends perpendicular to the direction of media travel. Note that nonlinear configurations are also contemplated.

Figure 3E:
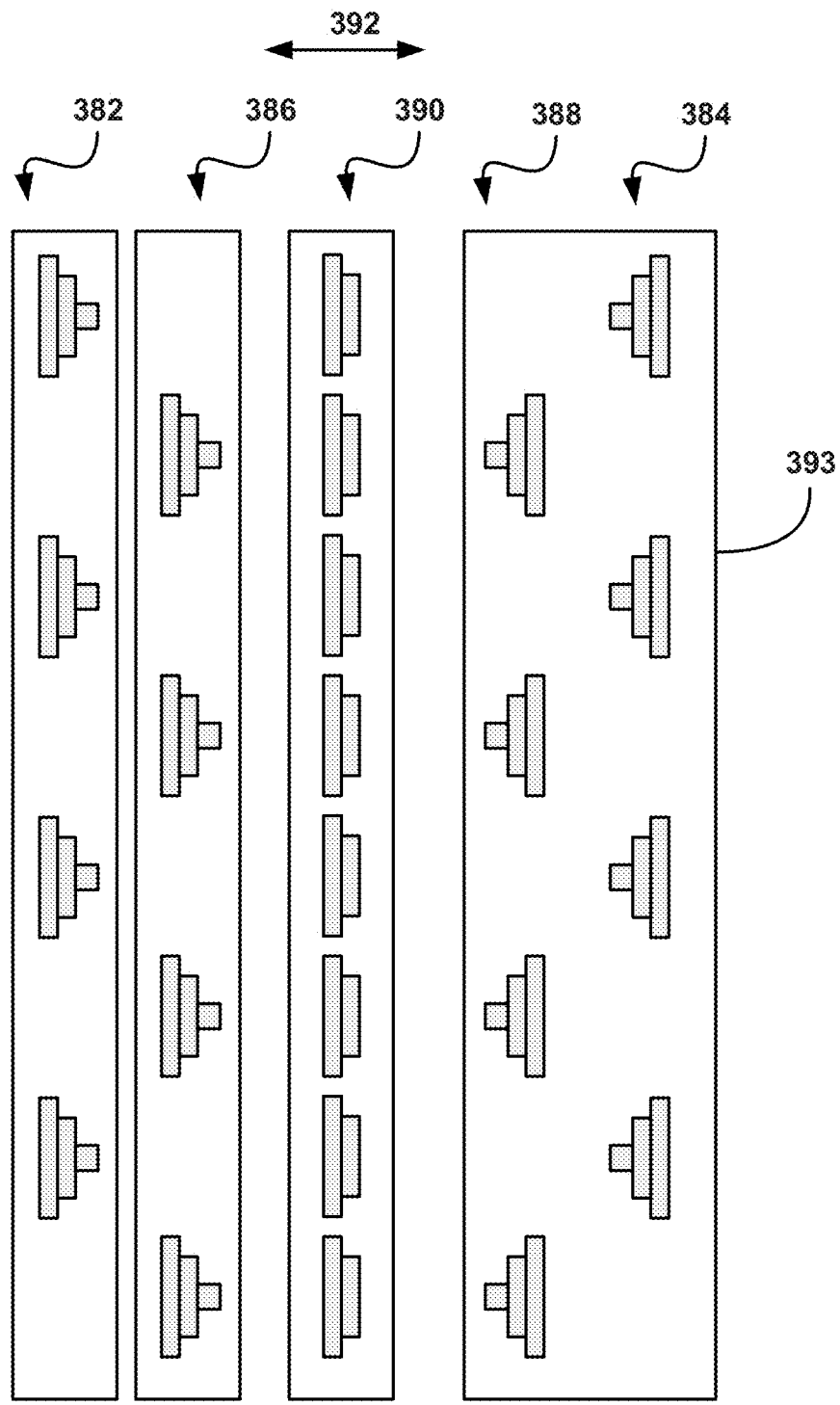
FIG. 3E is a partial tape bearing surface view of a magnetic head according to yet another embodiment of the present invention.

It should be noted that the arrays 382-390 may each be positioned separately on an individual module as shown in FIG. 3D. In another embodiment, shown in FIG. 3E however, at least two of the arrays may be on a common module 393 and are preferably separated spatially from each other in the direction of media travel 392 relative thereto.

In another approach, the first outer and inner arrays 382 and 386 may lie along a common first media-bearing surface, wherein the second outer and inner arrays 384 and 388 may lie along a second common media-bearing surface spaced from the first common media-bearing surface. For example, FIG. 8 depicts an embodiment where first inner and outer arrays may be formed on a common tape bearing surface e.g., 410, while second inner and outer arrays may be formed on another common tape bearing surface (shown by the modules in shadow). The middle module may include the readers of FIG. 3D.

As an option, the modules illustrated in FIGS. 3A-3D may be fixed relative to each other. As an additional option, provisions may be made to compensate for tape skew. Of course, these are optional embodiments and are not set forth as limitations to the modules illustrated in FIGS. 3A-3D.

More illustrative information will now be set forth in FIGS. 4-8 regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the inclusion or exclusion of other features described. Also, in FIGS. 4-8, many of the common and equivalent features are numbered the same throughout the various drawings.

Figure 4:
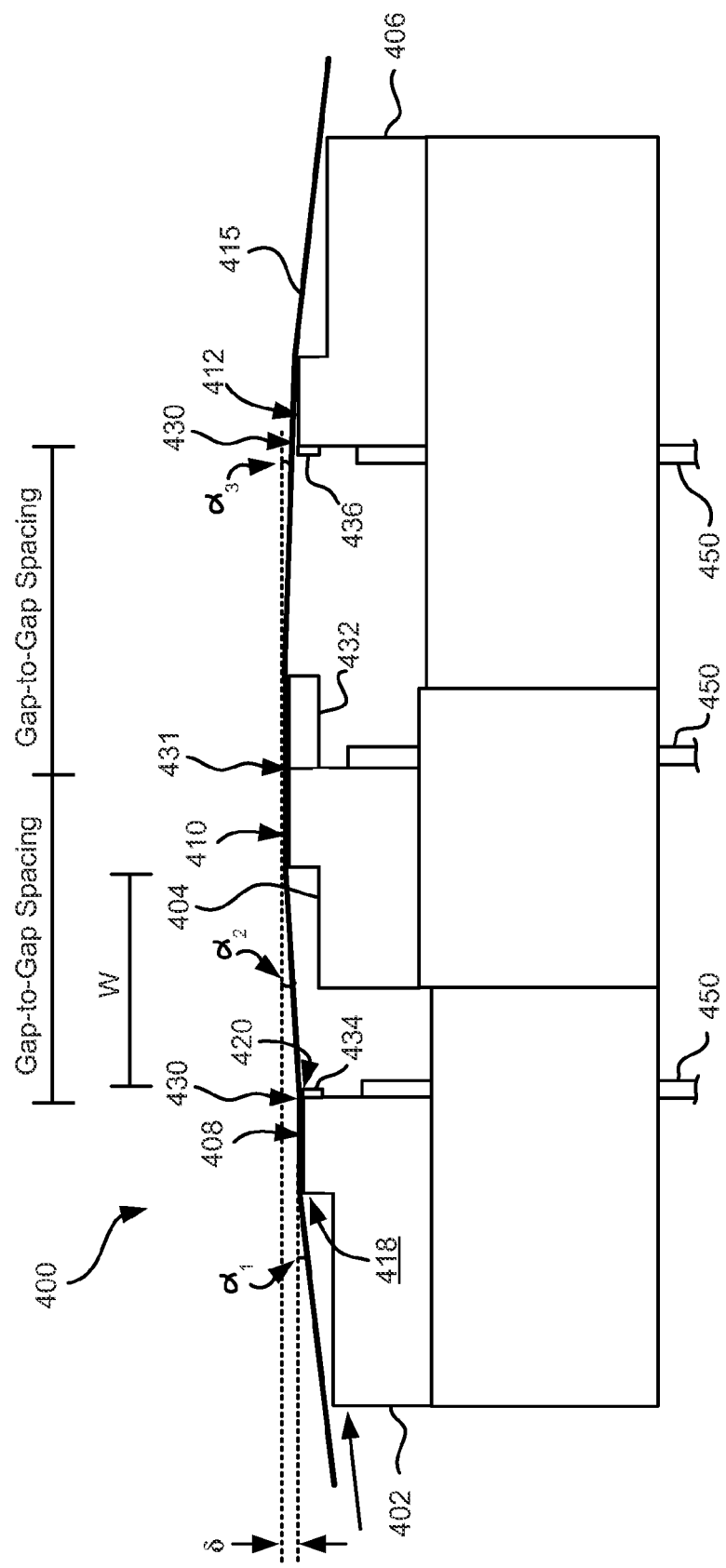
FIG. 4 illustrates a magnetic head according to one embodiment of the present invention.

FIG. 4 illustrates a magnetic head 400 according to one embodiment of the present invention that includes first, second and third modules 402, 404, 406 each having a flat or even contoured profile tape bearing surface 408, 410, 412 respectively. Note that while the term "tape bearing surface" appears to imply that the surface facing the tape 415 is in physical contact with the tape bearing surface, this is not necessarily the case. Rather, it is more typical that a portion of the tape is in contact with the tape bearing surface, constantly or intermittently, and other portions of the tape may ride above the tape bearing surface on a layer of air, sometimes referred to as an "air bearing".

The first module 402 will be referred to as the "leading" module as it is the first module encountered by the tape in a three module design for tape moving in the indicated direction. The third module 406 will be referred to as the "trailing" module. The trailing module follows the middle module and is the last module seen by the tape in a three module design. The leading and trailing modules 402, 406 are referred to collectively as outer modules. Also, note that the outer modules 402, 406 will alternate as leading modules, depending on the direction of travel of the tape 415.

In this embodiment, the tape bearing surfaces 408, 410, 412 of the first, second and third modules 402, 404, 406 may lie on parallel or nearly parallel planes such that the tape bearing surface 410 of the second module 404 is above the tape bearing surfaces 408, 412 of the first and third modules 402, 406. As described below, this has the effect of creating the desired wrap angle $\alpha_2$ of the tape relative to the tape bearing surface 410 of the second module 404.

Where the tape bearing surfaces 408, 410, 412 lie along parallel or nearly parallel, yet offset planes, intuitively, the tape should peel off of the tape bearing surface 408 of the leading module 402. However, the vacuum created by the skiving edge 418 of the leading module 402 has been found to be sufficient to keep the tape adhered to the tape bearing surface 408 of the leading module 402. The modules may be slightly angled to compensate for the peeling effect. The trailing edge 420 of the leading module 402 (the end from which the tape leaves the leading module 402) is the approximate reference point which defines the wrap angle $\alpha_2$ over the tape bearing surface 410 of the second module 404. In certain instances, the tape stays close to the tape bearing surface until close to the trailing edge 420 of the leading module 402. Accordingly, read and/or write elements 430 may be located near the trailing edges of the outer modules 402, 406. Cables 450 are operatively coupled to the elements 430. These embodiments are particularly adapted for write-read-write applications. It should be noted that the tape bearing surface may be curved or have curved portions in some embodiments.

As an option, the outer modules 402, 406 may be fixed at a determined offset from the second module 404, such that the inner wrap angle $\alpha_2$ is fixed when the modules 402, 404, 406 are coupled together or are otherwise fixed into a head. The inner wrap angle $\alpha_2$ is approximately $\tan^{-1}(\delta/W)$ where $\delta$ is the height difference between the planes of the tape bearing surfaces 408, 410 and W is the width between the opposing ends of the tape bearing surfaces 408, 410. An illustrative inner wrap angle $\alpha_2$ is in a range of about 0.5° to about 1.1°, though can be any angle required by the design.

In some cases, the wrap angle $\alpha_2$ may be slightly more on the side of the module 404 receiving the tape (leading edge) than the wrap angle $\alpha_3$ on the trailing edge, as the tape 415 rides above the trailing module 406. This difference may be beneficial, in some instances, as a smaller $\alpha_3$ tends to oppose what has heretofore been a steeper exiting effective wrap angle.

Note also that because, in some embodiments, the tape bearing surfaces 408, 412 of the outer modules 402, 406 are lower than the tape bearing surface 410 of the second module 404, a negative wrap angle may be achieved at the trailing edge 420 of the leading module 402. This may help in reducing wear of the trailing edge 420, provided that proper consideration is given to the location of the crowbar region that forms in the tape where it peels off the head. The negative wrap angle also may reduce flutter and scrubbing damage to the elements on the leading module 402. Further, at the trailing module 406, the tape 415 may fly over the tape bearing surface 412 so there is virtually no wear on the elements during this motion. Particularly, the tape 415 entrains air and so will not significantly ride on the tape bearing surface 412 of the third module 406 (some contact may occur). This is permissible, because the leading module 402 is writing while the trailing module 406 is idle.

Writing and reading functions are performed by different modules at any given time. In one embodiment, the second module 404 includes a plurality of data and optional servo readers 431 and no writers. In this case, the first and third modules 402, 406 may include a plurality of standard writers 430 and no readers, with the exception that the outer modules 402, 406 may include optional servo readers. The servo readers are used to position the head during writing operations.

Where each module has only data readers or writers, subject to exceptions listed herein, the reader processing may be optimized and yielded independently of the writer processing (on a different module), and conversely. The servo readers may be omitted from the writers, depending on dynamic skew limitations. Alternatively, servo readers may reflect older technology (AMR) with wider gaps than data readers (GMR).

In some embodiments, the second module 404 has a closure, while the first and third modules 402, 406 do not have a closure. Where there is no closure, a hard coating may be added to the module. One coating is diamond-like carbon (DLC).

In the embodiment shown in FIG. 4, the first, second, and third modules 402, 404, 406 each have a closure, which extends the tape bearing surface of the associated module, thereby effectively positioning the read/write elements away from the edge of the tape bearing surface. The closure 432 on the second module 404 can be a ceramic closure of a type typically found on tape heads. The closures 434, 436 of the first and third modules 402, 406, however, may be shorter than the closure 432 of the second module 404 as measured parallel to a direction of tape travel over the respective module. This enables setting the modules closer together. One way to produce the shorter closures 434, 436 is to lap the standard ceramic closures of the second module 404 an additional amount. Another way is to plate or deposit thin film closures above the elements during thin film processing. For example, a thin film closure of a hard material such as Sendust or nickel-iron alloy (e.g. 45/55) can be formed on the module.

With reduced-thickness ceramic or thin film closures 434, 436 or no closures on the outer modules 402, 406, the write-to-read gap spacing can be reduced to less than about 1 mm, e.g., about 0.75 mm, or about 50% less than standard LTO tape head spacing. The open space between the modules 402, 404, 406 can still be set to approximately 0.5 mm, which in some embodiments is ideal for stabilizing tape motion over the second module 404.

The outer wrap angles $\alpha_1$ are typically set in the drive, such as by rollers. For instance, rollers having an offset axis may be used to set the wrap angles. The offset axis creates an orbital arc of rotation, allowing precise alignment of the wrap angle $\alpha_1$.

Figure 5:
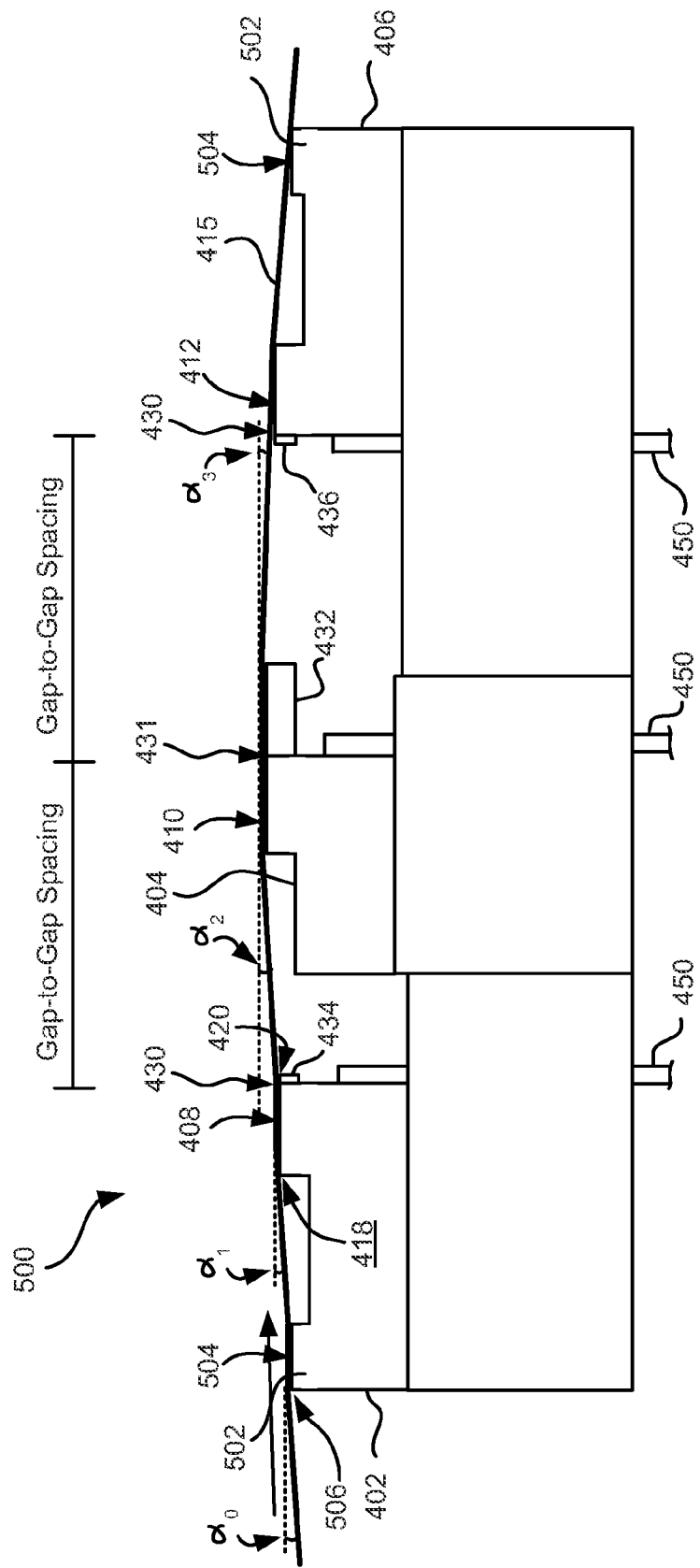
FIG. 5 illustrates a magnetic head according to one embodiment of the present invention including outriggers formed on outer modules.

The outer wrap angles can also be set by outriggers. FIG. 5 illustrates an embodiment 500 where outriggers 502 are formed on the outer modules 402, 406.

The outriggers 502 control the outer wrap angle $\alpha_1$ of the tape 415 relative to the tape bearing surfaces 408 of the leading module 402. As shown, each outrigger 502 may have a flat tape bearing surface 504 that, like typical flat profile heads, induces a small spacing between a tape 415 passing thereover and its tape bearing surface 504. The outrigger 502 may lie on a plane which may be approximately parallel to the tape bearing surface of the associated module. In such an embodiment, the outrigger tape bearing surface 504 is positioned below the plane of the tape bearing surface of the associated element, thereby creating the proper wrap angle $\alpha_1$ of the tape 415 relative to the tape bearing surface of the associated module.

With reference to the current embodiment, because the outrigger 502 may be formed directly on the module, the outer wrap angle $\alpha_1$ is always precisely set (just as the inner wrap angles $\alpha_2$ may be fixed when the modules are coupled together).

While the outrigger 502 may be integrally formed on the associated module, alternatively, the outrigger 502 can be a separate piece mounted to the associated module, mounted in the drive, not directly coupled to the module but held in position relative thereto by mounting hardware in the drive, etc. As mentioned above, the outrigger 502 may be fixedly coupled in relation to the associated module, such that the outer wrap angles $\alpha_1$ remains fixed regardless of initial outer wrap angle $\alpha_o$ of the tape approaching the outrigger 502.

By using an outrigger 502, the external wrap angle $\alpha_o$ is less critical, and so greater tolerances are permitted. Particularly, tape wrap variations at the outer (skiving) edge 506 of the outrigger 502 do not change the internal wrap angle $\alpha_1$. One example of an external wrap angle $\alpha_o$ for the outrigger 502 is 0.6°±0.5° or 0.7°±0.5°, but can be as high as 2° or higher. In some cases, only a very slight initial wrap angle $\alpha_o$ (e.g., 0.1°) need be present in order to create the desired tacking down of the tape to the tape bearing surface of the outrigger. Wraps below 0.1 degrees have a higher risk of the tape popping off the outrigger 502, and wraps above 1.1 degrees may produce undesirable spacing increase.

Figure 6:
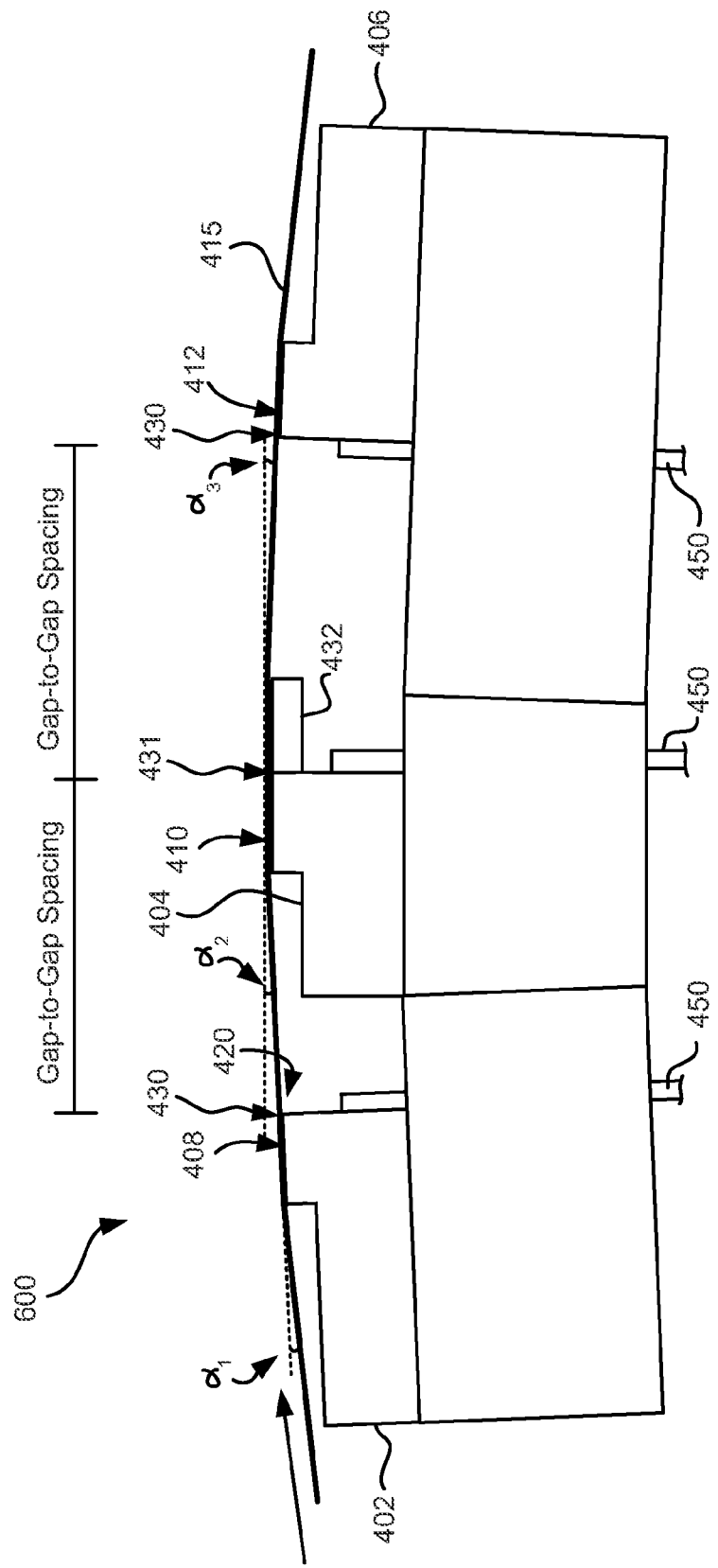
FIG. 6 illustrates a magnetic head according to one embodiment of the present invention where modules are in a tangent (angled) configuration.

Depending on tape tension and stiffness, it may be desirable to angle the tape bearing surfaces of the outer modules relative to the tape bearing surface of the second module. FIG. 6 illustrates an embodiment 600 where the modules 402, 404, 406 are in a tangent (angled) configuration. Particularly, the tape bearing surfaces of the outer modules 402, 406 are about parallel to the tape at the desired wrap angle $\alpha_2$ of the second module 404. In other words, the planes of the tape bearing surfaces 408, 412 of the outer modules 402, 406 are oriented at about the desired wrap angle $\alpha_2$ of the tape 415 relative to the second module 404. In some cases, the tape may also pop off of the trailing module 406 in this embodiment, thereby reducing wear on the elements in the trailing module 406. These embodiments are particularly adapted for write-read-write applications. Additional aspects of these embodiments are similar to those given above.

Figure 7:
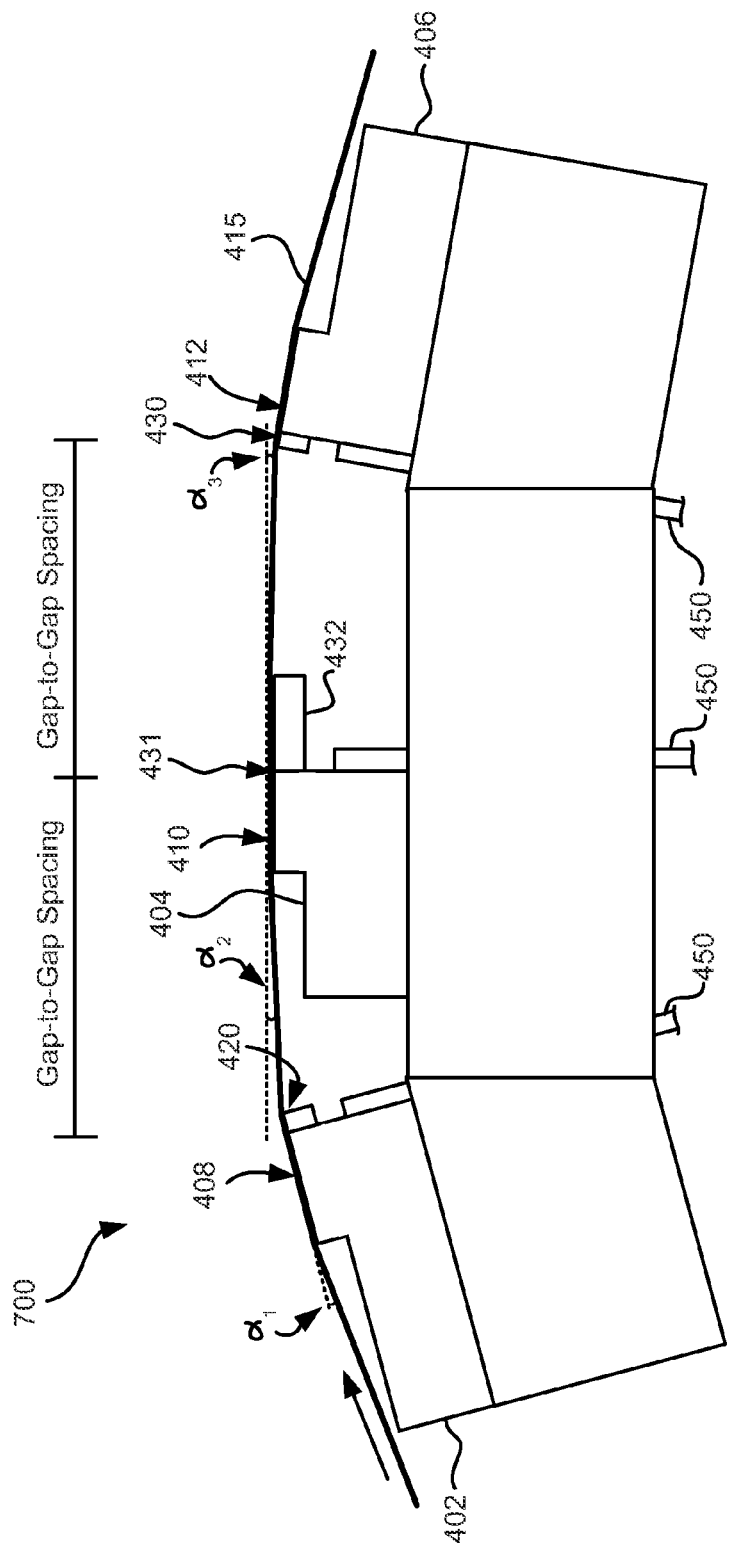
FIG. 7 illustrates a magnetic head according to one embodiment of the present invention including modules in an overwrap configuration

FIG. 7 illustrates an embodiment 700 where the modules 402, 404, 406 are in an overwrap configuration. Particularly, the tape bearing surfaces 408, 412 of the outer modules 402, 406 are angled slightly more than the tape 415 when set at the desired wrap angle $\alpha_2$ relative to the second module 404. In this embodiment, the tape does not pop off of the trailing module, allowing it to be used for writing or reading. Accordingly, the leading and middle modules can both perform reading and/or writing functions while the trailing module can read any just-written data.

FIG. 8 illustrates an embodiment 800 where a substrate of a module 802 is coupled to the closure 432, thus forming a longer tape bearing surface. Strictly as an option, such coupling may include gluing the substrate of the module 802 to the closure 432. As an option, the module 404 and the module 802 may correspond to writers which are positioned such that a gap-to-gap spacing is reduced. Additional aspects of the embodiments shown in FIGS. 6-8 are similar to those given above.

Any of the above embodiments or combinations of portions thereof can also be applied to any type of magnetic heads and magnetic recording systems, both known and yet to be invented. For example, the teachings herein are easily adaptable to interleaved heads, which typically include opposing modules each having an array of alternating readers and writers configured to provide read-while-write capability.

Another embodiment allows reading and/or writing to magnetic media such as magnetic tape in multiple formats. For example, the head can write and/or read data in both legacy and advanced formats, and in doing so enables full backward compatibility with legacy media types. This may be accomplished by equipping the head with two arrays of elements (readers and/or writers), each array being associated with a different format. The first and second arrays of elements may be proximate to each other in a direction transverse to a direction of travel of a magnetic medium over the head, and so may be formed simultaneously during thin film buildup. Depending on the format, which is generally communicated to the drive by a cartridge memory chip, the proper array is selected (by software, system, user input, etc.) and aligned with a given data band in a conventional way, e.g., by servoing. In one example, once the system determines which format to use, the particular array associated with that format is energized and then used to read/write data on the tape.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a first outer array of writers;
   a second outer array of writers;
   a first inner array of writers positioned between the first and second outer arrays;
   a second inner array of writers positioned between the first inner array and the second outer array; and
   an array of readers, at least some of the readers being generally aligned with the writers of the first and second outer arrays in a direction of media travel relative thereto,
   wherein the writers of the first inner array are misaligned with the writers of the first outer array relative to the direction of media travel,
   wherein the number of writers in the first outer array of writers is one half the number of readers in the array of readers.

2. An apparatus as recited in claim 1, wherein the writers in the first outer array of writers are aligned along a straight line oriented perpendicular to the direction of media travel.

3. A magnetic head, comprising:
   a first outer array of writers;
   a second outer array of writers;
   a first inner array of writers extending along a planar first tape bearing surface and positioned between the first and second outer arrays;
   a second inner array of writers extending along a planar second tape bearing surface and positioned between the first inner array and the second outer array; and
   an array of readers extending along a planar third tape bearing surface, at least some of the readers being generally aligned with the writers of the first and second outer arrays in a direction of media travel relative thereto,
   wherein the writers of the first inner array are misaligned with the writers of the first outer array relative to the direction of media travel,
   wherein the first, second and third tape bearing surfaces lie along offset planes.

4. A head as recited in claim 1, wherein the misalignment of the writers of the first inner array relative to the writers of the first outer array is by about one half a distance between adjacent writers in the first outer array.

5. A head as recited in claim 1, wherein the array of readers is positioned between the first and second inner arrays.

6. A head as recited in claim 1, wherein at least some of the readers are generally aligned with the writers of the first and second inner arrays in a direction of media travel relative thereto.

7. A head as recited in claim 1, wherein the arrays are each positioned on an individual module.

8. A head as recited in claim 1, wherein the first outer and inner arrays lie along a common first media-bearing surface, wherein the second outer and inner arrays lie along a second common media-bearing surface spaced from the first common media-bearing surface.

9. A head as recited in claim 1, wherein at least two of the arrays are on a common substrate and separated spatially from each other in the direction of media travel relative thereto.

10. A head as recited in claim 1, wherein the writers in each particular array of writers are each aligned along a straight line extending through the particular array.

11. A head as recited in claim 1, wherein the planes are nonparallel.

12. A head as recited in claim 1, wherein the planes are parallel.

13. A head as recited in claim 1, wherein the planes intersect one another.

14. A head as recited in claim 1, wherein the planes are angled thereby defining inner wrap angles between adjacent pairs of the tape bearing surfaces.

15. A head as recited in claim 1, wherein the first, second and third tape bearing surfaces are in a tangent configuration.

16. A head as recited in claim 1, wherein the first, second and third tape bearing surfaces are in an overwrap configuration.

17. A head as recited in claim 1, wherein the number of writers in the first outer array of writers is one half the number of readers in the array of readers.

18. A head as recited in claim 17, wherein the writers in the first outer array of writers are aligned along a straight line oriented perpendicular to the direction of media travel.

19. A head as recited in claim 1, wherein the number of writers in the first inner array of writers is one half the number of readers in the array of readers.

* * * * *